United States Patent
Osaki et al.

(10) Patent No.: US 11,494,697 B2
(45) Date of Patent: Nov. 8, 2022

(54) METHOD OF SELECTING A MACHINE LEARNING MODEL FOR PERFORMANCE PREDICTION BASED ON VERSIONING INFORMATION

(71) Applicant: Hitachi, Ltd., Tokyo (JP)

(72) Inventors: Hiroyuki Osaki, Los Gatos, CA (US); Masanori Takada, Santa Clara, CA (US); Akiyoshi Tsuchiya, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 16/803,558

(22) Filed: Feb. 27, 2020

(65) Prior Publication Data
US 2021/0272012 A1   Sep. 2, 2021

(51) Int. Cl.
*G06N 20/00* (2019.01)
*G06F 11/34* (2006.01)
*G06F 16/901* (2019.01)
*G06F 9/455* (2018.01)
*G06F 8/71* (2018.01)

(52) U.S. Cl.
CPC .......... *G06N 20/00* (2019.01); *G06F 8/71* (2013.01); *G06F 9/45558* (2013.01); *G06F 11/3466* (2013.01); *G06F 16/9027* (2019.01); *G06F 2009/45595* (2013.01)

(58) Field of Classification Search
CPC ....... G06N 20/00; G06F 16/9027; G06F 8/71; G06F 9/45558; G06F 11/3466; G06F 2009/45595
See application file for complete search history.

(56) References Cited

U.S. PATENT DOCUMENTS

| | | | |
|---|---|---|---|
| 2019/0156247 A1* | 5/2019 | Faulhaber, Jr. | G06N 3/08 |
| 2019/0227847 A1* | 7/2019 | Jha | G06N 3/0454 |
| 2020/0285503 A1* | 9/2020 | Dou | G06F 9/5072 |

FOREIGN PATENT DOCUMENTS

| | | |
|---|---|---|
| JP | 2019-125322 A | 7/2019 |
| WO | 2015/198440 A1 | 12/2015 |

OTHER PUBLICATIONS

Nipun Ramakrishnan and Tarun Soni. 2018. Network Traffic Prediction Using Recurrent Neural Networks. In Proceedings of the 17th IEEE International Conference on Machine Learning and Applications (ICMLA'18). IEEE. (Year: 2018).*
Han C. W. Hsiao, Sean H. F. Chen and J. P. Jeffrey, Deep Learning for Risk Analysis of Specific Cardiovascular Diseases Using Environmental Data and Outpatient Records, IEEE (Year: 2016).*

(Continued)

*Primary Examiner* — Jacob D Dascomb
(74) *Attorney, Agent, or Firm* — Procopio, Cory, Hargreaves & Savitch LLP (57) ABSTRACT

Example implementations described herein are directed to searching ML models to facilitate IO load prediction. Even if there is no existing ML model applicable to the underlying container, example implementations described herein obtain the ML model for the nearest container. Through such example implementations, the underlying systems can reduce the total ML models maintained for the prediction of IO load and can enhance ML models with enough learning data for each ML model.

18 Claims, 6 Drawing Sheets

(56) References Cited

OTHER PUBLICATIONS

H. Zhao, J. Liang, X. Yin et al., "Domain-specific ModelWare: to make the machine learning model reusable and reproducible," in Proceedings of the 12th ACM/IEEE International Symposium on Empirical Software Engineering and Measurement, p. 2, Oulu, Finland, Oct. 2018. (Year: 2018).*

* cited by examiner

METHOD OF SELECTING A MACHINE LEARNING MODEL FOR PERFORMANCE PREDICTION BASED ON VERSIONING INFORMATION

BACKGROUND

Field

The present disclosure is directed to Information Technology (IT) systems, and more specifically, to conducting Input/Output (IO) load prediction through use of machine learning (ML) implementations.

Related Art

The needs of IT system users and system engineers in recent years involve agile updates of customer applications in order to capture social changes (e.g., container restart 10 times/day, and so on). However, the IT operations manager must check for IT system availability prior to conducting any operation to the application. In particular, some operations such as storage IO load forecasting by IT operations managers have become a bottleneck and prevent agility.

In a related art implementation, there is a storage management method for relocating data based on a prediction model created by machine learning data read requests and data write requests. In another related art implementation, there is a management server that acquires storage and application information indicating a past IO load on the storage area. The management server estimates the IO load on the storage area by the application based on the storage and application information to obtain an estimated value.

SUMMARY

In example implementations described herein, machine learning techniques are applied to predict IO load and prevent application performance failure.

Aspects of the present disclosure can include a method, involving determining, from a repository including a plurality of machine learning (ML) models, each of the plurality of ML models configured to conduct performance prediction, a ML model from the plurality of ML models to conduct the performance prediction for a container implemented on a server, the determining the ML model including searching the repository based on a version tree of the container; and executing the ML model from the plurality of ML models to conduct the performance prediction for the container implemented in the server.

Aspects of the present disclosure can further include a non-transitory computer readable medium, storing instructions for executing a process, the instructions involving determining, from a repository including a plurality of machine learning (ML) models, each of the plurality of ML models configured to conduct performance prediction, a ML model from the plurality of ML models to conduct the performance prediction for a container implemented on a server, the determining the ML model including searching the repository based on a version tree of the container; and executing the ML model from the plurality of ML models to conduct the performance prediction for the container implemented in the server.

Aspects of the present disclosure can further involve a server, which can include a processor, configured to determine, from a repository including a plurality of machine learning (ML) models, each of the plurality of ML models configured to conduct performance prediction, a ML model from the plurality of ML models to conduct the performance prediction for a container implemented on the server, by searching the repository based on a version tree of the container; and execute the ML model from the plurality of ML models to conduct the performance prediction for the container implemented in the server.

Aspects of the present disclosure can include a system, involving means for determining, from a repository including a plurality of machine learning (ML) models, each of the plurality of ML models configured to conduct performance prediction, a ML model from the plurality of ML models to conduct the IO prediction for a container implemented on a server, the means for determining the ML model involving means for searching the repository based on a version tree of the container; and executing the ML model from the plurality of ML models to conduct the performance prediction for the container implemented in the server.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to a machine learning (ML) application system to forecast IO load. Such a system includes the method to search applicable ML models from an ML model repository. Another implementation can include ML application system for conducting other types of performance prediction, such as predicting CPU load, memory overhead and IO latency.

Figure 1:
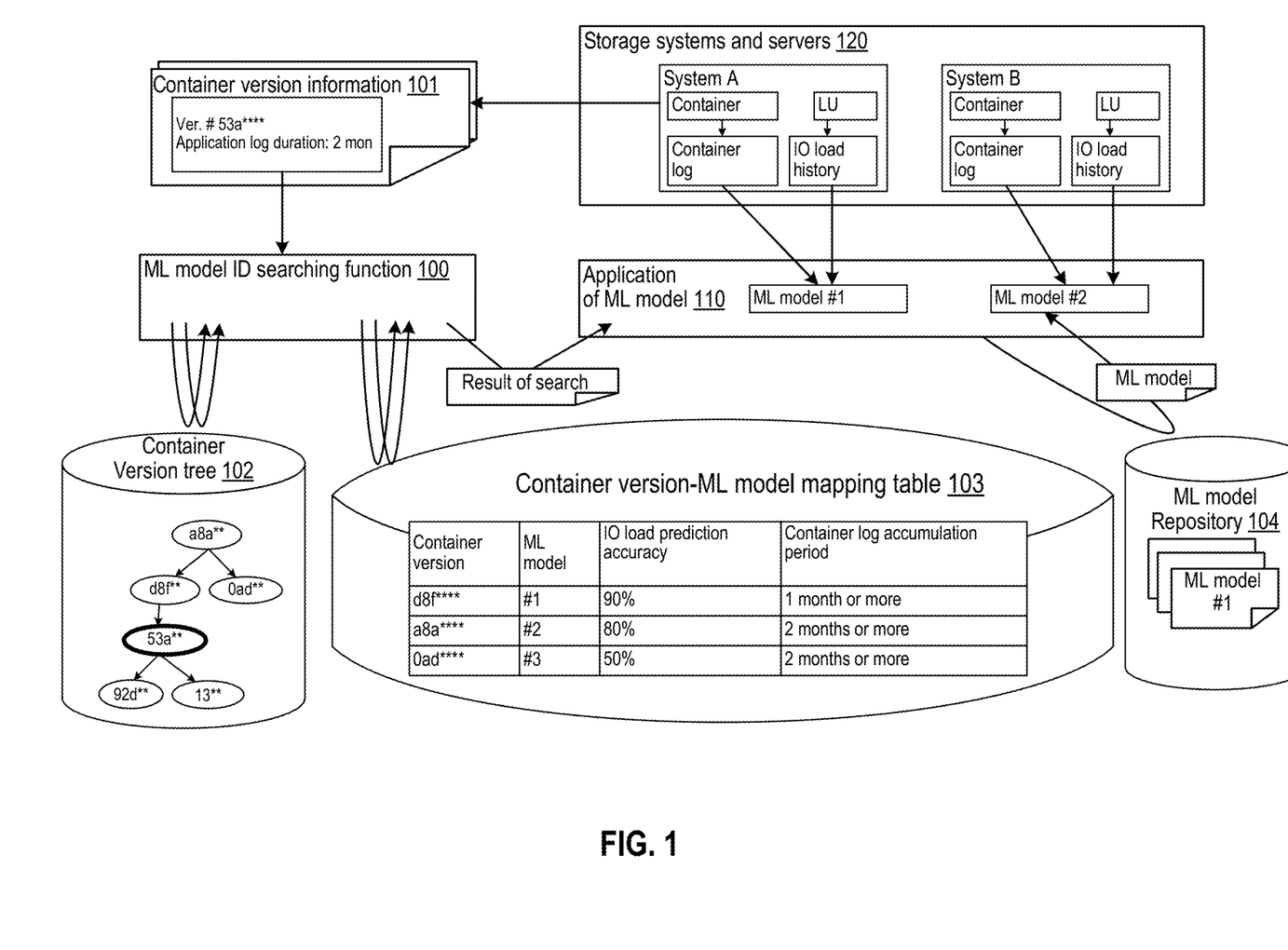
FIG. 1 illustrates a machine learning application system for forecast IO load, in accordance with an example implementation.

FIG. 1 illustrates a machine learning application system for forecast IO load, in accordance with an example implementation.

The searching function 100 retrieves container version information 101. The container version information includes the version identifier (ID) of the containers deployed on the corresponding storage systems and servers 120. The searching function 100 searches for the version ID in the container version tree 102. In an example implementation, container version tree 102 can be a Git system, container image versioning system like docker engine or a DockerHub system, or otherwise in accordance with the desired implementation. The searching function 100 searches the ML model repository 104 for the ML model applicable to the container using container version-ML model mapping table 103. Each of the ML models in the ML model repository 104 are configured to provide IO predictions, such as load IO or spike IO. Each of the ML models are generated for a specific container version.

The searching function 100 outputs some ML model numbers to the application function of the ML model 110. The application function 110 retrieves the ML model implementation from ML model repository 104 and starts the ML model inference process.

Container version information 101 indicates the version of the container implemented or to be implemented in the storage systems and servers 120. Such information can include the version number and the application log duration indicating the amount of accumulated log data associated with the version.

ML model ID searching function 100 searches for an ML model in the ML model repository 104 that corresponds with the container being utilized or to be implemented in the storage systems and servers 120. Further details of the ML search function are provided in FIGS. 4 and 5.

Container version-ML model mapping table 103 maps the ML models in the ML repository 104 to their respective container version. Based on the historical application logs, the container version-ML model mapping table 103 derives the IO prediction accuracy through historical analysis. Depending on the desired implementation, container version-ML model mapping table 103 can also contain information regarding the container log accumulation period, which indicates the amount of application logs needed to generate an ML model for that particular container version. Thus, if the model falls below a certain accuracy level, then the model can be retrained and regenerated if there is sufficient data in the application logs. Further, for a new container version, once the accumulated logs have reached the required period, then a new ML model can be generated for such a version. The value for the container log accumulation period can be set manually or otherwise in accordance with the desired implementation.

Figure 2:
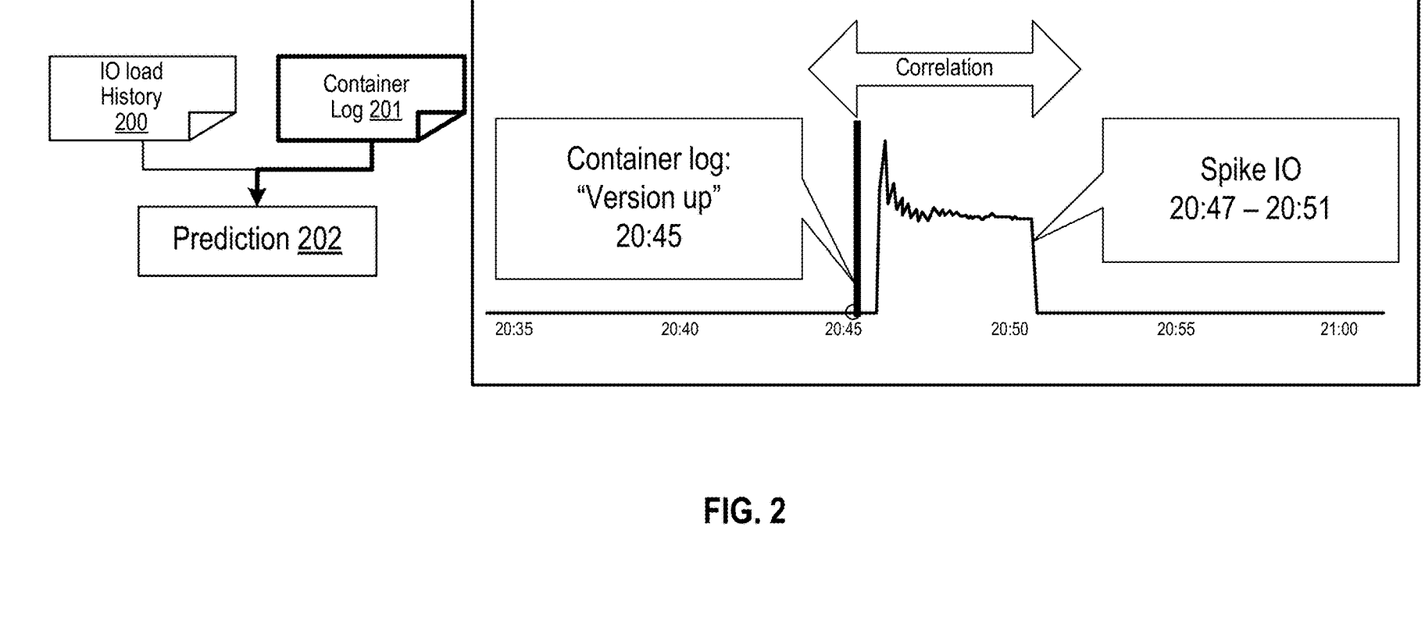
FIG. 2 illustrates an example of an ML model predicting IO load, in accordance with an example implementation.

FIG. 2 illustrates an example of an ML model predicting IO load, in accordance with an example implementation. Specifically, FIG. 2 illustrates how ML models predict IO load (e.g., such as spike IO) 202 from a container log 201 (e.g. application event logs). IO prediction ML model 202 learns data regarding the IO load history 200 and container log 201 and determines correlations between events in the container log and occurrences of spike IO. In the example of FIG. 2, the container log indicating that a "version up" has been conducted is determined to be correlated to a spike IO a few minutes later.

Once a prediction 202 is obtained, the predicted IO can be compared against a threshold set in accordance with the desired implementation. If the IO exceeds the threshold, then the system can be configured to automatically suppress application events within the container (e.g., run container events on a lower thread priority, temporarily shut down other running applications, etc.). In another example implementation, the system can also allocate the appropriate resources (e.g., CPU, memory) in anticipation of the load IO exceeding a threshold. Such an example implementation can be helpful for spike IO which involves a temporary spike in IO load on the system, which may be addressable by temporarily allocating the appropriate resources.

There is a limitation in that each of the ML models may only be applicable to one kind of container. Thus, there is a need for many ML models to predict IO load of some types of systems. There is a further need to search the ML model applicable to each container. The system in FIG. 1 is used to search one ML model from many ML models in the repository efficiently.

Figure 3:
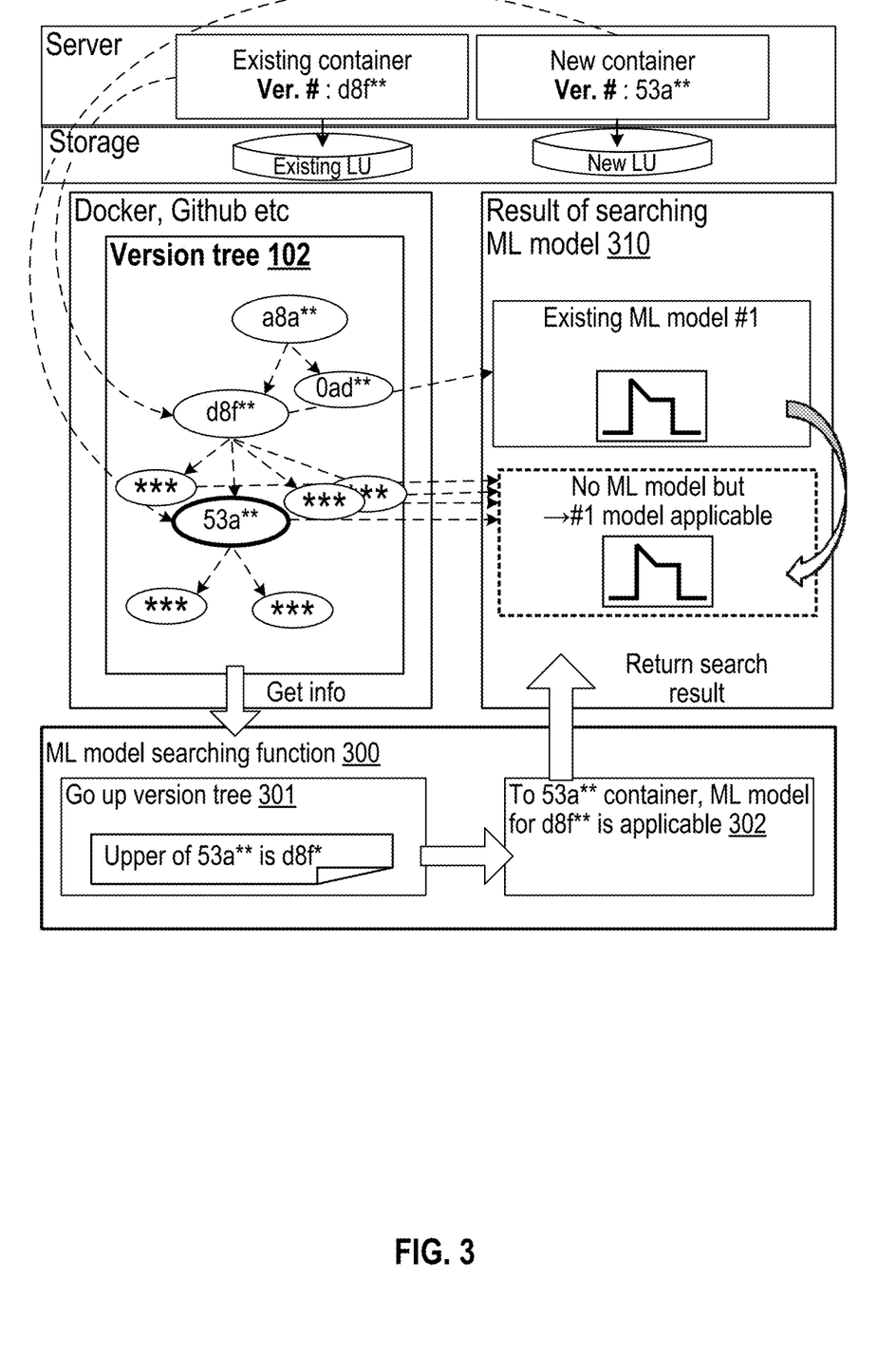
FIG. 3 illustrates an example use case of the searching function, in accordance with an example implementation.

FIG. 3 illustrates an example use case of the searching function, in accordance with an example implementation. All container images are managed internally by version number and version tree as shown at 102. The ML searching function 300 can also go up and down the version tree 102 gradually as shown at 301 and 302. When the distance between versions is short (e.g., one hop away), the internal operating system (OS) settings and application settings are similar, so the sudden IO load is similar. Through this concept, the number of IO load prediction models can be reduced to about $1/100$ in comparison to the related art. After traversal of the version tree 102, an example search result could be that there is no ML model that corresponds to the version number of the container, but there is a model that is close based on the distance of the version tree that is applicable as illustrated at 310.

Figure 4:
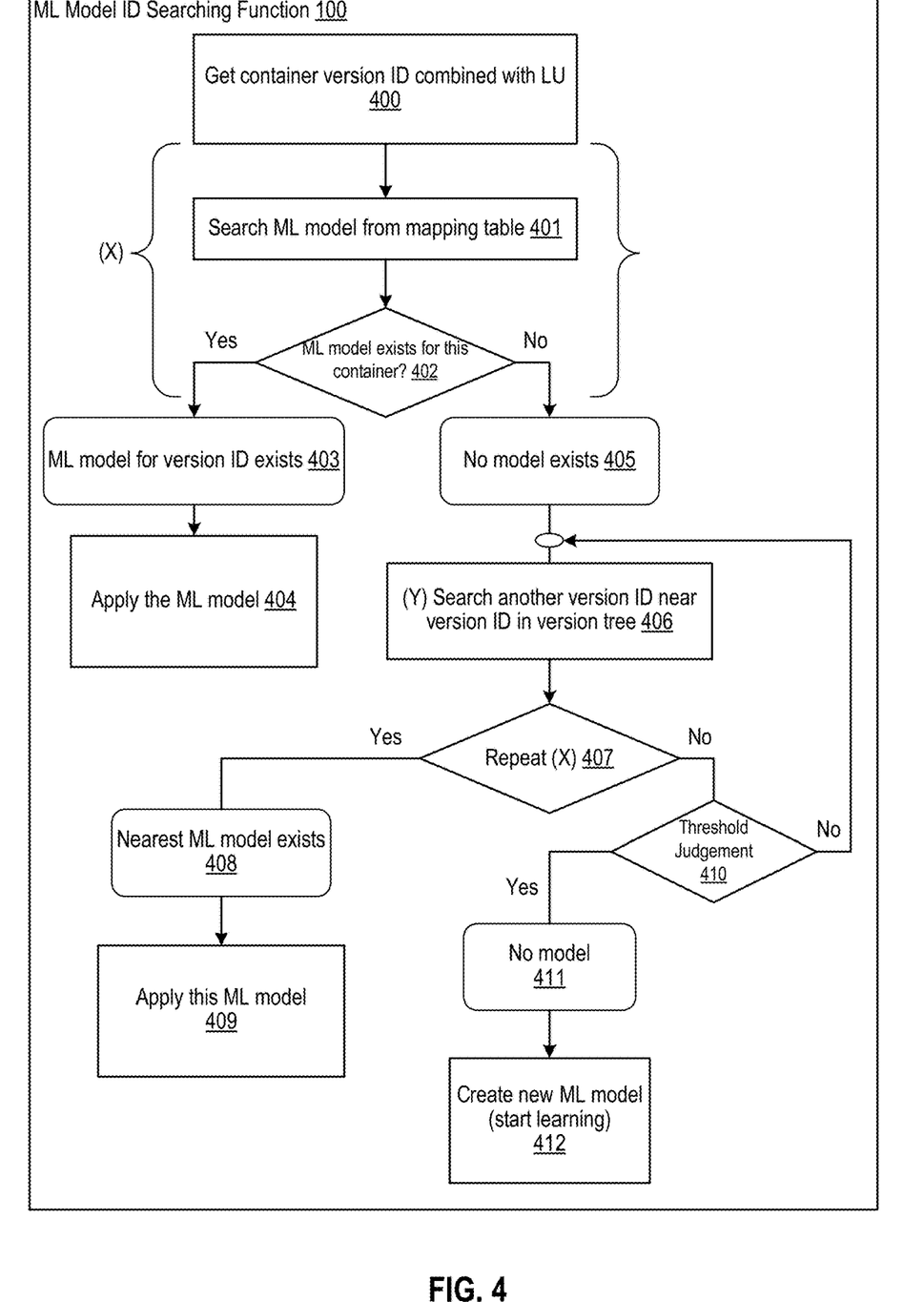
FIG. 4 illustrates an example of the flow of the searching function, in accordance with an example implementation.

FIG. 4 shows an example of the flow of the searching function, in accordance with an example implementation. At 400, the searching function 100 retrieves the container version ID as combined with the logical unit. At 401, the searching function 100 checks if there is a relevant ML model (for explanation purposes, this process is labeled as 'X'). Process X involves, at 401, searching for the ML model having the container version ID in the repository based on the mapping table. At 402, a determination is made as to whether such a model exists for the container version. If there is such a model (Yes), then a determination is made that an ML model corresponding to the container version exists at 403, whereupon the ML model is applied to the server at 404.

If there is no ML model (No), then the searching function 100 determines that no ML model exists that corresponds to the container version at 405. At 406 the searching function 100 then searches for the nearest version ID on the version tree and repeats the process X at 408. If a nearby ML model exists (Yes) then the ML searching function 100 proceeds to 408 whereupon the searching function 100 determines that a nearby ML model exists and applies the nearest ML model at 409.

Otherwise (No) if ML model is found, then the ML searching function 100 repeats process X until the threshold judgement terminates the search at 410. The threshold judgement is used for limiting the search process in accordance with the desired implementation to prevent perpetual searching. Thus, if the threshold judgment is not met (No) the process is repeated from 406 to traverse the version tree and determine another version having a corresponding ML model that can be applicable.

If the threshold judgment is met (Yes), then a termination condition has been met regarding the limitations of the search. Thus at 411, the ML searching function 100 determines that there is no model that can be applicable to the current container. At 412, the ML searching function 100 initiates the process to being generating a new model.

Figure 5:
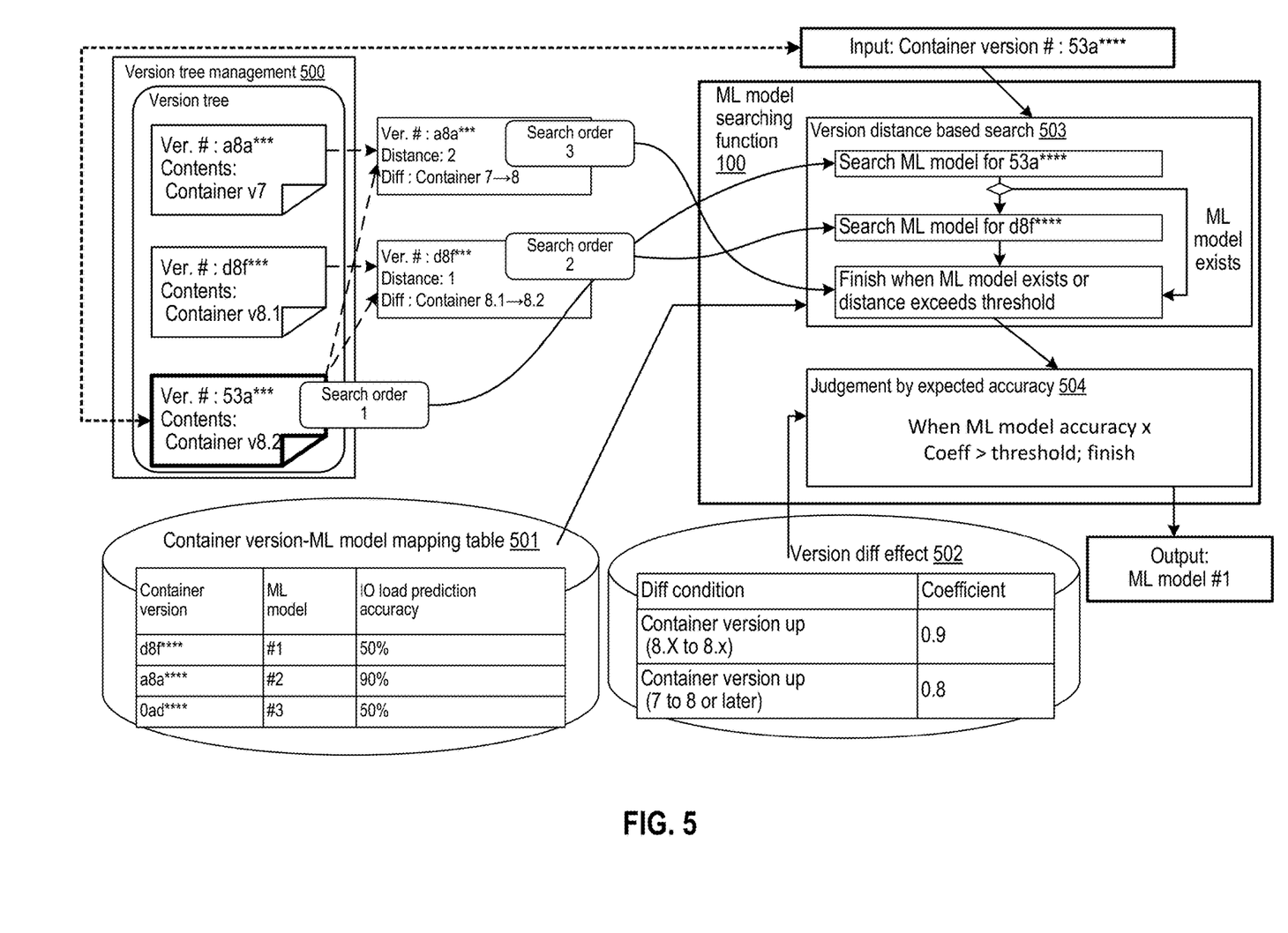
FIG. 5 shows an example of the threshold judgement process, in accordance with an example implementation.

FIG. 5 shows an example of the threshold judgement process, in accordance with an example implementation. Specifically, FIG. 5 illustrates an example of version distance based search and judgment by expected accuracy of the ML model. Such judgement algorithms can be incorporated together or separately, in accordance with the desired implementation.

Version tree management 500 manages the version tree 102 by managing the relationship between different versions of the container. As illustrated, each node in the tree contains information regarding the version number, the contents, and the next connected node in the tree. In the example illustrated in FIG. 5, the versions correspond to Container v7, Container v8.1 and Container v8.2.

Container version-ML model mapping table 501 manages the relationship between the container version, the ML model associated with the container version, and the corresponding IO prediction accuracy for a given container. Such information can be constructed in accordance with the desired implementation, which can involve analysis based on historical data, can be manually provided, and so on in accordance with the desired implementation. Such information is provided to the version distance based search 503, which will utilize the IO prediction accuracy to determine expected accuracy for the input container version.

Version diff effect 502 indicates the coefficient or weight that should be applied between container versions. In the example of FIG. 5, models for container version 7 have a coefficient of 0.5 when applied to container versions 8 or later. Similarly, models for container version 8.x have a coefficient of 0.9 when applied to other models having container version 8.x.

Version distance based search 503 is an iterative process that searches for the corresponding ML model to be applied to the input container version. If an ML model already exists, then that ML model is utilized. Otherwise, the version distance based search 503 will traverse the version tree through using version tree management 500 to determine applicable ML models.

Judgment by expected accuracy 504 determines the accuracy of an applicable ML model extracted from version distance based search 503. ML models are selected based on the weighing as determined from the container version-ML model mapping table 501 and version diff effect 502. In an example implementation, an example judgment can be determined from multiplying the ML model accuracy as determined from the container version-ML model mapping table 501 with the coefficient obtained from the version diff effect 502, and comparing the result to a preset threshold. If the obtained model has a result that is less than the obtained value, then the ML model searching function 100 discontinues the search. Then, the ML model having the highest result can be provided as output.

In the example of FIG. 5, the search terminates when the ML model exists or the distance judgment as returned from expected accuracy 504 exceeds a threshold, however, other example implementations are also possible and the present disclosure is not limited thereto. For example, if the ML model corresponding to the container version has a prediction accuracy that falls below the threshold, then a new model can be selected to replace the ML model and the ML model corresponding to the container version can be retrained and regenerated. In such example implementations, the ML models can be changed as needed if the accuracy falls below the threshold.

In the example of FIG. 5, it is assumed that Container version #: 53a** is implemented on the server. The input provided to the ML model searching function 100 is container version #53a. ML model searching function 100 executes the version distance based search 503 to initially search for an ML model corresponding to 53a. From a search of the version tree stored in version tree management 500, it is determined that no ML model exists for 53a**.

Accordingly, the version tree is traversed to neighboring nodes. At one hop away, there is a ML model corresponding for d8f* found in the version tree management 500**, denoted as ML model #1. The expected accuracy is 50%*0.9=0.40, which is below the threshold in this example. As the ML model exceeds the threshold, another search is conducted, and the next node in version tree is version a8a***, denoted as ML model #2. The expected accuracy is 90%*0.8=0.72, which exceeds the threshold required. Thus, the ML model searching function terminates its search, and provides ML model #2 as the output for the container 53a****.

Figure 6:
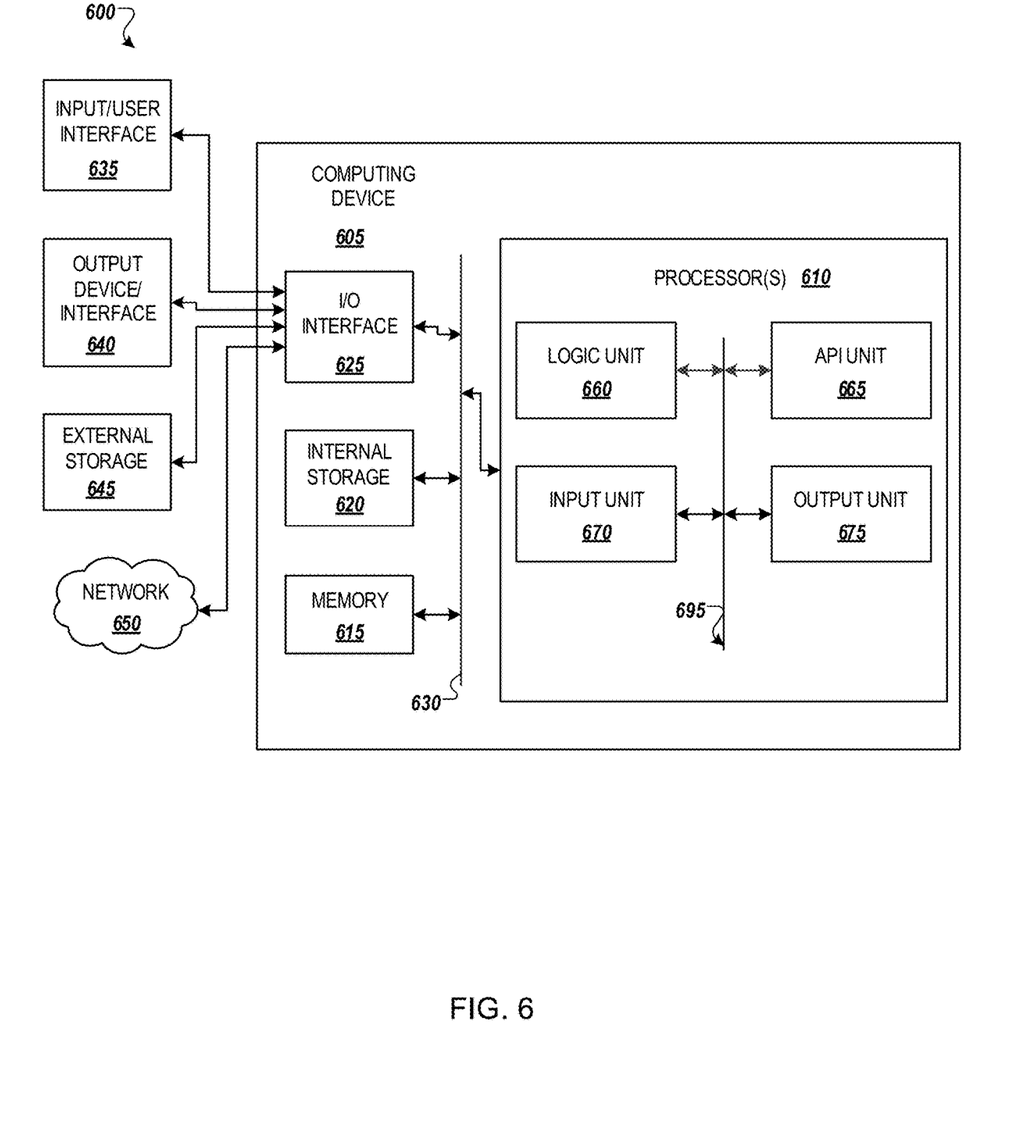
FIG. 6 illustrates an example computing environment with an example computer device suitable for use in some example implementations.

FIG. 6 illustrates an example computing environment with an example computer device suitable for use in some example implementations. Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or IO interface 625, any of which can be coupled on a communication mechanism or bus 630 for communicating information or embedded in the computer device 605. IO interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via IO interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

IO interface 625 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

As illustrated in FIGS. 1-5, processor(s) 610 can be configured to facilitate the functionality of ML model ID searching function 100 and the implementations as illustrated, and thus configured to determine, from a repository involving a plurality of machine learning (ML) models 104, each of the plurality of ML models configured to conduct performance prediction, a ML model from the plurality of ML models to conduct the performance prediction for a container implemented on a server, the determining the ML model involving searching the repository based on a version tree of the container through ML model ID searching function 100; and executing the ML model from the plurality of ML models to conduct the performance prediction for the container implemented in the server as illustrated in FIG. 4.

As illustrated in FIG. 2, the performance prediction can involve prediction of spike IO, wherein the ML models are configured to conduct performance prediction through predicting spike M.

Processor(s) 610 can be configured to search the repository based on the version tree of the container by, for the searching being indicative of there being no ML model corresponding to a version of the container in the repository as shown at 402 and 405 of FIG. 4, searching the repository for ones of the plurality of ML models having a different version of the container based on traversing the version tree of the container as shown at 406 of FIG. 4 and FIG. 5, and selecting one or more of the plurality of ML models based on a distance from the version of the container implemented in the server determined from the traversing of the version tree of the container as shown at 410 of FIG. 4 and FIG. 5.

As illustrated at 504 of FIG. 5, processor(s) 610 can be configured to select the one or more of the plurality of ML models by estimating an IO prediction accuracy based on the distance from the version of the container, and selecting the one or more of the plurality of ML models having an accuracy above a threshold.

Depending on the desired implementation, processor(s) 610 can further configured to, for a prediction accuracy of the executed ML model falling below a threshold, changing the executed ML model through conducting another search of the repository as illustrated at 504 of FIG. 5; and for the container accumulating a log for a preset period of time and for the prediction accuracy of the executed ML model falling below the threshold, generating an ML model configured for performance prediction corresponding to the version of the container as illustrated in FIG. 1.

Processor(s) 610 can also be configured to, for the executed ML model predicting an IO load meeting a threshold, suppressing application events on the server as illustrated in FIG. 2.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   determining, from a repository comprising a plurality of machine learning (ML) models, each of the plurality of ML models configured to conduct performance prediction, a ML model from the plurality of ML models to conduct the performance prediction for a container implemented on a server, the determining the ML model comprising searching the repository based on a version tree of the container;
   executing the ML model from the plurality of ML models to conduct the performance prediction for the container implemented in the server; and
   allocating resources based on the performance prediction generated from the executed ML model.

2. The method of claim 1, wherein the performance prediction comprises prediction of spike IO, wherein the ML models are configured to conduct performance prediction through predicting spike IO.

3. The method of claim 1, wherein the searching the repository based on the version tree of the container comprises:
   responsive to an indication, based on the searching, that none of the plurality of ML models correspond to a version of the container in the repository, searching the repository for ones of the plurality of ML models having a different version of the container based on traversing the version tree of the container, and selecting one or more of the plurality of ML models based on a distance from the version of the container implemented in the server determined from the traversing of the version tree of the container.

4. The method of claim 3, wherein the selecting the one or more of the plurality of ML models comprises estimating an IO prediction accuracy based on the distance from the version of the container, and selecting the one or more of the plurality of ML models having an accuracy above a threshold.

5. The method of claim 1, further comprising:
   responsive to a prediction accuracy of the executed ML model falling below a threshold, changing the executed ML model through conducting another search of the repository; and
   responsive to the container accumulating a log for a preset period of time and for the prediction accuracy of the executed ML model falling below the threshold, generating an ML model configured for performance prediction corresponding to the version of the container.

6. The method of claim 1, further comprising, responsive to the executed ML model predicting an IO load meeting a threshold, suppressing application events on the server.

7. A non-transitory computer readable medium, storing instructions for executing a process, the instructions comprising:
   determining, from a repository comprising a plurality of machine learning (ML) models, each of the plurality of ML models configured to conduct performance prediction, a ML model from the plurality of ML models to conduct the performance prediction for a container implemented on a server, the determining the ML model comprising searching the repository based on a version tree of the container;
   executing the ML model from the plurality of ML models to conduct the performance prediction for the container implemented in the server; and
   allocating resources based on the performance prediction generated from the executed ML model.

8. The non-transitory computer readable medium of claim 7, wherein the performance prediction comprises prediction of spike IO, wherein the ML models are configured to conduct performance prediction through predicting spike IO.

9. The non-transitory computer readable medium of claim 7, wherein the searching the repository based on the version tree of the container comprises:
   responsive to an indication, based on the searching, that none of the plurality of ML models correspond to a version of the container in the repository, searching the repository for ones of the plurality of ML models having a different version of the container based on traversing the version tree of the container, and selecting one or more of the plurality of ML models based on a distance from the version of the container implemented in the server determined from the traversing of the version tree of the container.

10. The non-transitory computer readable medium of claim 9, wherein the selecting the one or more of the plurality of ML models comprises estimating an IO prediction accuracy based on the distance from the version of the container, and selecting the one or more of the plurality of ML models having an accuracy above a threshold.

11. The non-transitory computer readable medium of claim 7, the instructions further comprising:
responsive to a prediction accuracy of the executed ML model falling below a threshold, changing the executed ML model through conducting another search of the repository; and
responsive to the container accumulating a log for a preset period of time and for the prediction accuracy of the executed ML model falling below the threshold, generating an ML model configured for performance prediction corresponding to the version of the container.

12. The non-transitory computer readable medium of claim 7, the instructions further comprising, responsive to the executed ML model predicting an IO load meeting a threshold, suppressing application events on the server.

13. A server, comprising:
a processor, configured to:
determine, from a repository comprising a plurality of machine learning (ML) models, each of the plurality of ML models configured to conduct performance prediction, a ML model from the plurality of ML models to conduct the performance prediction for a container implemented on the server, by searching the repository based on a version tree of the container;
execute the ML model from the plurality of ML models to conduct the performance prediction for the container implemented in the server; and
allocating resources based on the performance prediction generated from the executed ML model.

14. The server of claim 13, wherein the performance prediction involves prediction of spike IO, wherein the ML models are configured to conduct performance prediction through predicting spike IO.

15. The server of claim 13, wherein the processor is configured to search the repository based on the version tree of the container by:
responsive to an indication, based on the searching, that none of the plurality of ML models correspond to a version of the container in the repository, searching the repository for ones of the plurality of ML models having a different version of the container based on traversing the version tree of the container, and selecting one or more of the plurality of ML models based on a distance from the version of the container implemented in the server determined from the traversing of the version tree of the container.

16. The server of claim 15, wherein the processor is configured to select the one or more of the plurality of ML models by estimating an IO prediction accuracy based on the distance from the version of the container, and selecting the one or more of the plurality of ML models having an accuracy above a threshold.

17. The server of claim 13, the processor further configured to:
responsive to a prediction accuracy of the executed ML model falling below a threshold, change the executed ML model through conducting another search of the repository; and
responsive to the container accumulating a log for a preset period of time and for the prediction accuracy of the executed ML model falling below the threshold, generate an ML model configured for performance prediction corresponding to the version of the container.

18. The server of claim 13, the processor configured to, responsive to the executed ML, model predicting an IO load meeting a threshold, suppress application events on the server.

* * * * *